May 4, 1965
J. B. LATZER
3,181,311
REFRIGERATED TRAILER
Filed Feb. 2, 1962
3 Sheets-Sheet 3
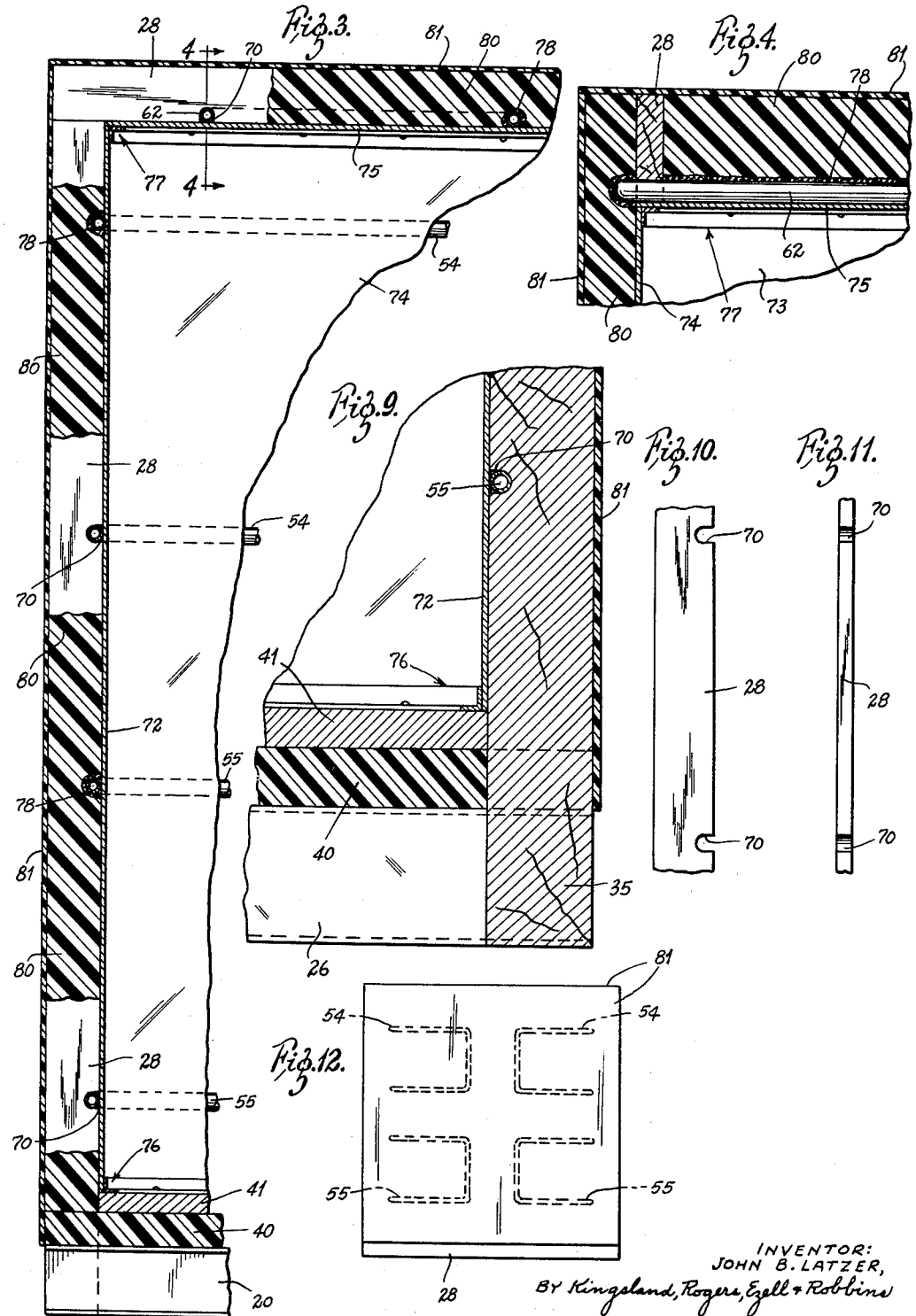
INVENTOR:
JOHN B. LATZER,
BY Kingsland, Rogers, Ezell & Robbins
ATTORNEYS

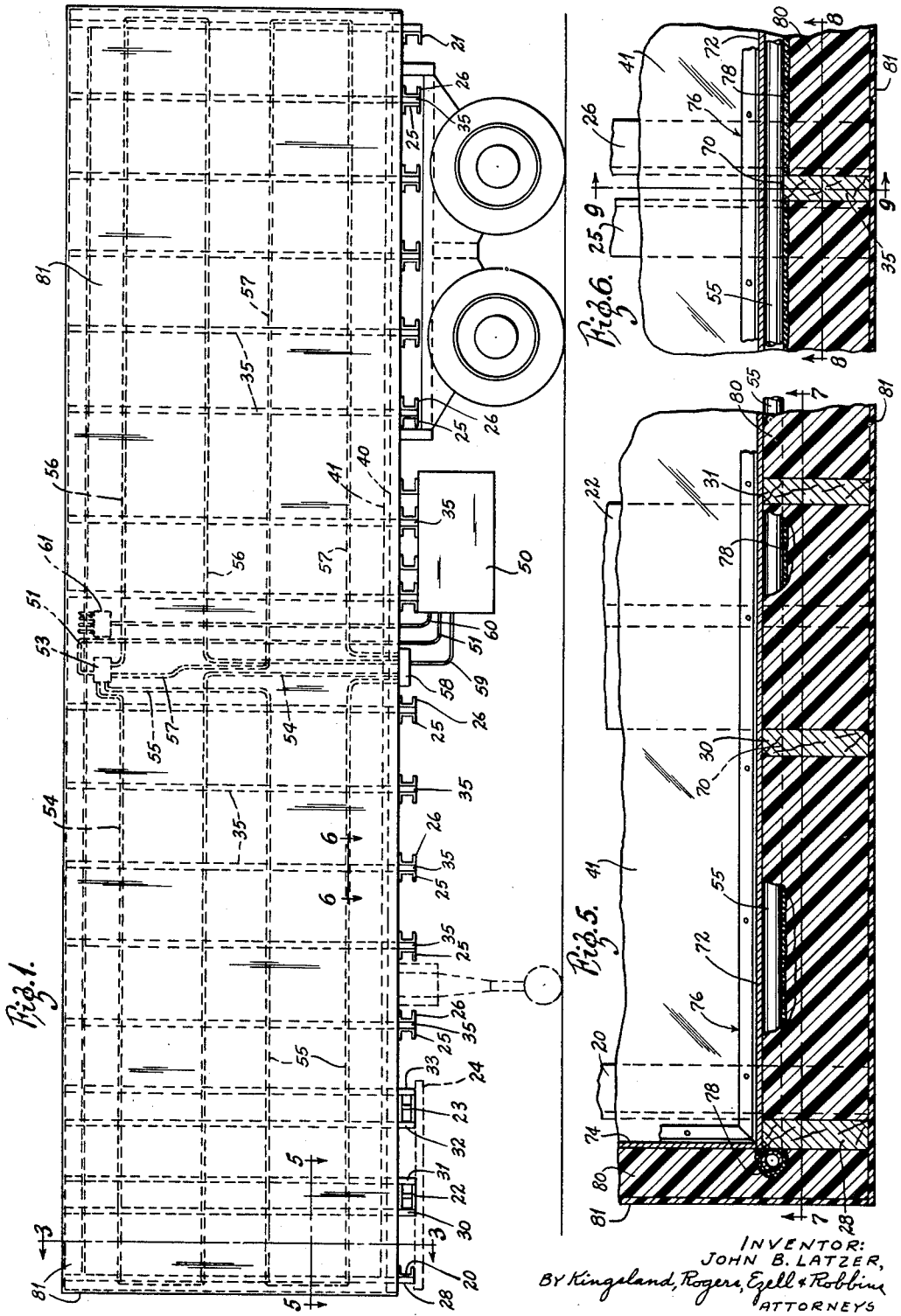

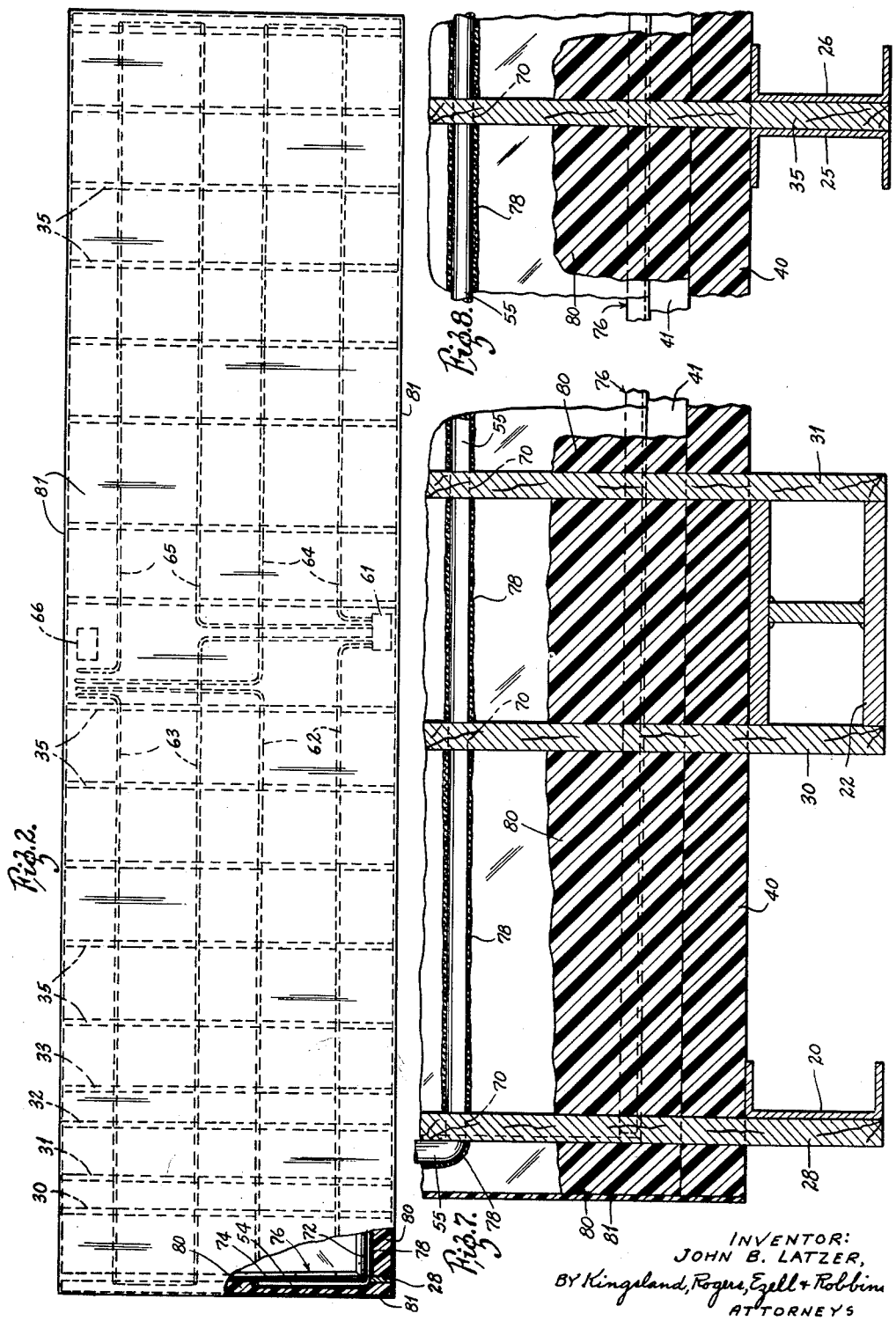

United States Patent Office 3,181,311
Patented May 4, 1965

3,181,311
REFRIGERATED TRAILER
John B. Latzer, 5 University Lane, Clayton, Mo.
Filed Feb. 2, 1962, Ser. No. 170,570
9 Claims. (Cl. 62—440)

The present invention relates to a vehicle body construction. More particularly, it relates to a refrigerated body in which refrigeration conduits are mounted in the walls thereof, so as to act as evaporator means for refrigerant circulated by a conventional compressor system mounted on the vehicle.

Generally speaking, the vehicle body includes a bed supported upon one or more conventional trucks with wheels. In the preferred form, the bed is made up of a plurality of transverse channel members, certain pairs of which are placed close together in back-to-back relationship. Between them are mounted the lower ends of U-shaped ribs that extend upwardly at the opposite sides and across the top of the body.

Within the foregoing framework, there is a lining, made preferably of aluminum sheeting for the walls and ceiling, and of heavier aluminum elements for the floor. Refrigeration tubing is supported in the ribs and is cemented to the outside of the wall and ceiling panels. Outside the aluminum wall and ceiling panels a substantial thickness of foamed plastic insulation material such as polyurethane foam is bonded to the sheeting, the ribs and to the tubing. Finally, an outside surface of rigid material, metal or plastic, such as a fiberglass polyester mixture is applied onto the entire exterior of the body.

The foregoing accomplishes the principal objective of the invention which is to provide a refrigerated vehicle body wherein the refrigerant evaporator conduits are extended across, and constitute an integral part of the wall of the vehicle. A further objective accomplished by the foregoing construction is that the tubing is, in effect, integral with an inwardly exposed metal lining so that heat is readily conducted through the metal lamination and the walls of the conduit to the refrigerant to be conducted away.

The construction accomplishes the further object that the evaporator conduits are firmly supported by the ribs as well as by polyurethane lamination, that can be applied in fluent form but which sets up into a rigid, strong structural element. Finally, the arrangement provides means to accomplish the objective of enabling the exterior surface of the body to be formed of a plastic material that can be force-fed into place in fluent form but which can set up into a durable, strong exterior wall surface.

Other objects will appear from the description to follow.

In the drawings:

FIGURE 1 is a side elevation of the vehicle body illustrating by dotted lines the adjuncts by which it may be formed as a trailer;

FIGURE 2 is a top view of the vehicle body partly broken away;

FIGURE 3 is a vertical section through the front wall taken on the line 3—3 at the left end of FIGURE 1;

FIGURE 4 is a somewhat enlarged section on the line 4—4 at the top of FIGURE 3;

FIGURE 5 is a horizontal section on the line 5—5 at the lower left corner of FIGURE 1;

FIGURE 6 is a fragmental horizontal section on the line 6—6 at the lower left middle of FIGURE 1;

FIGURE 7 is a view of the lower front portion of the side wall, parts being broken away, taken on the line 7—7 across the lower portion of FIGURE 5;

FIGURE 8 is a view somewhat similar to FIGURE 5, but taken on the line 8—8 across the lower section of FIGURE 6;

FIGURE 9 is a section showing a portion of a lower corner of the body taken on the line 9—9 across FIGURE 6;

FIGURE 10 is a fragmental view of a portion of one of the ribs;

FIGURE 11 is an edge view of such a portion of a rib; and

FIGURE 12 is a front elevation of the body on reduced scale.

The invention is illustrated as incorporated in a trailer body, but it will be understood that it may be embodied in other vehicle bodies. The bed of the body comprises a series of transverse beams spaced from front to rear. At the front and at the rear there are similar transverse channel beams 20 and 21; just behind the front channel beam 20 there are two spaced H-beams 22 and 23. H-beams 22 and 23 have the advantage of giving strong support for securement of a hitching plate 24 by means of which the trailer can be attached to a tractor. Between the beam 23 and the beam 21, there are a plurality of back-to-back channels 25 and 26 spaced apart as indicated. The beams 22 and 23 preferably are made of steel, while the other beams 20, 21 and 25, 26 may be made of aluminum.

The framework of the body includes, in addition to the bed beams aforesaid, U-shaped ribs that have their legs upstanding at the sides of the body and their cross members extending across the top of the body. The lower portions of the ribs are secured by bolts or other attaching means to the flat web portion of the beams.

The cross beam 20 supports the lower end of a rib 28, disposed as shown in FIGURE 7. The H-beam 22 supports ribs 30 and 31 while the beam 23 supports similar ribs 32 and 33.

Each pair of remaining back-to-back transverse beams 25 and 26, spaced along the body rearwardly from the beam 23, supports ribs 35 attached between connecting or web portions, so that the ribs are securely supported thereby.

The ribs are illustrated as being made of wood. However, they may be made of other material such as aluminum, or plastic. The framework comprising the bed beams and the U-shaped ribs constitutes a support for the panels and parts that provide the walls of the body.

After the ribs are in place, the floor can be laid. It includes an under layer 40 of plastic or the like, preferably high density polyurethane. This may be constructed of cast sheets in 8′ widths, and of suitable thickness, extending along the bed of the body, from side to side, and secured to the bed beams. The sheets or slabs may be notched to receive the lower ends of the ribs. On top of the plastic under layer 40, a floor 41 is laid and securely attached. It may consist of treads of 1½″ aluminum, 18″ wide, laid across the body from side to side. This provides the frame with a floor that adds strength and rigidity and insulation against both heat loss and noise. To this subassembly refrigeration tubes are added, including evaporator tubes that are primarily supported in notches on the interior edges of the legs and cross members of the ribs of the framework.

The wall and ceiling panels have refrigerant tubing connected to them. As will later appear, the refrigerant tubing is in several sections. At the present time it is sufficient to observe that it is in the form of piping, soldered or otherwise firmly secured to the outer surfaces of wall, end and ceiling panels that, with the floor, form an inner body shell.

The refrigeration system employed with this truck body consists of a typical compressor, condenser, expansion device and evaporator connected serially in a closed system. Preferably it uses three expansion valves, each of the multi-outlet type. Enough evaporator passes may be provided for each side, end and top area. The drawings show four separate evaporator passes for each side and top area, but it is not intended that the number illustrated shall be limiting. It is only required that there be a sufficient number and disposition of the expansion coils to refrigerate the walls and the interior of the trailer body.

As illustrated, the box 50 suspended under the bed of the body represents the compressor and condenser of the refrigeration system. It has several high pressure outlets from the condenser, of which it will be sufficient to trace one. The outlet 51 is designed to service the upper left side as illustrated in FIGURE 1. To this end, it leads to a multi-outlet expansion valve 53 that has four outlets. The outlet 54 includes an upper left pass for this side. The outlet 55 includes a lower left refrigerant pass, while the outlets 56 and 57 similarly provide for the upper and lower portions of the back half of the side. As shown especially in FIGURE 12, the passes 54 and 55 extend around the forward corner of the body and across half of the front of the body. All of these four passes discharge into a low pressure manifold 58 that has a suction pipe 59 connecting back into the compressor. The thermostatic controls are conventional and are not illustrated.

In similar fashion another outlet 60 leads from the compressor-condenser system 50 to an expansion valve 61 designed to have outlets for four coils 62, 63, 64 and 65 in the top. As illustrated, the four top evaporator coils discharge down the other side, but this disposition is not critical. As shown also in FIGURE 2, there is an expansion device 66 for appropriate coils on the panel 73 similar to those on the side opposite that in FIGURE 1, and the other half of the front.

As shown in the drawings, the ribs are notched to receive and give primary support to the refrigeration tubes. The rib 28, illustrated separately in FIGURES 10 and 11, is provided with notches 70 for this purpose.

In constructing the body, the evaporator tubing is inserted into the notches 70 in the ribs, and adequately attached to the ribs. Following this, inner lining panels are attached in position on the inner edges of the ribs. These include side panels 72 and 73 (FIGURES 3 and 4), an end panel 74, and a top or ceiling panel 75. Screws may be used to secure the panels onto the ribs. Angles are attached by appropriate means to seal the corners of the inner aluminum panels and also to increase the rigidity of the structure. An angle arrangement 76 connects the bottom edges of the side and end panels 72, 73, 74 to the metal floor 41, and an angle arrangement 77 connects the top edges of these side and end panels to the ceiling panel 75.

With the inner shell thus assembled in the framework, the tubing is united to the outside surfaces of the wall and sealing panels 72–75 by a conductive mastic illustrated at 78, that is designed to increase the support of the tubing into the body and also to provide a high quality of heat conductivity between the interior of the tubing and the aluminum shell panels. A suitable material is Presstite Thermal Mastic 440 Series. Although an initially plastic but finally rigid material such as solder could be used, preferably this mastic is somewhat elastic or resilient so as to permit a certain degree of weaving of the body without causing the tubing to become detached from the panels. The tubing should be of a metal or other material that can withstand some degree of deformation and flexing without injury.

After the foregoing subassembly of frame, inner shell and refrigeration system has been completed, the outside of the panels, tubing, and ribs is filled with a polyurethane foam filler 80. Preferably, this can be applied in a fluid state and dried in position so that it sets up and forms a unitary structure, cementing itself to the ribs, the panels and the tubing. It is relatively light in weight and an excellent heat insulation. It may, however, be pre-cast to size and shape, inserted into position, and cemented to the ribs, panels, and tubing by a strong adhesive such as an epoxy resin. The filler contributes to the support of the tubing and also to the structural rigidity of the body. It is somewhat elastic so that it can withstand the weaving of the body without breaking.

On the outside of the whole body, a layer of fiberglass and polyester mixture 81 is applied as by spraying. This provides a hard, durable surface that gives a pleasing appearance and upon which suitable lettering may be placed if desired.

The back end of the body can be provided with doors.

With the body constructed in the foregoing manner, complete cold wall-type refrigeration can be provided, which gives a uniform cooling of the interior of the truck body at a minimum cost in energy. This construction has proved free of the difficulties heretofore encountered in connection with refrigerated transport, such as the problem of the breakage of the refrigeration tubing as a result of rough roads and the like.

The invention has been illustrated as embodied in a truck body, and more particularly in a trailer body. It is understood that it can be used in other vehicles, and some of its features may, if desired, be used for stationary refrigeration chambers. However, normally stationary refrigeration chambers do not require the mechanical strength and durability provided by this construction, and so can be made with cheaper construction.

Tests have established that the present truck body construction can reduce the horsepower consumption to about 50% for the same volume being refrigerated.

Another advantage of the present construction is that the servicing is greatly simplified. The plastic outer coating 81 and the foam plastic layer 80 can be cut through to give access to the refrigerant tubing or to the ribs, or to the outer surface of the liner panelling. After servicing the latter, new foam plastic and new fiberglass can be applied. Such repair work can be done so as to leave no externally visible marks, and no impairment, either structurally or functionally, in the body.

Various changes and modifications may be made within the process of this invention as will be readily apparent to those skilled in the art. Such changes and modifications are within the scope and teaching of this invention as defined by the claims appended hereto.

What is claimed is:

1. In a body construction: a bed, a box-like chamber, comprising an inner lining shell of heat-conductive material; a refrigeration conduit along the outside wall of the shell, means securing the conduit to the shell in close relationship to permit heat conduction from the shell to the conduit; initially fluent plastic insulating material around the shell and the conduit, the material being bonded to the shell and the conduit, and coating outside the insulating material, the coating comprising an initially fluent plastic, finally solid, material bonded directly onto the insulating material.

2. In a body construction: a bed, a box-like chamber, comprising an inner lining shell of heat-conductive material; a refrigeration conduit along the outside wall of the shell, means securing the conduit to the shell in close relationship to permit heat conduction from the shell to the conduit; initially fluent plastic insulating material around the shell and the conduit, the material being bonded to the shell and the conduit, and coating outside the insulating material, the means securing the conduit to the shell comprising a mastic-type plastic material bonded to the conduit and to the shell, the material being solid but yieldable to permit small deformations of the shell under conditions of use.

3. In a body construction: a bed, a box-like chamber, comprising an inner lining shell of heat-conductive material; a refrigeration conduit along the outside wall of the shell, means securing the conduit to the shell in close relationship to permit heat conduction from the shell to the conduit; initially fluent plastic insulating material around the shell and the conduit, the material being bonded to the shell and the conduit, and coating outside the insulating material, the bed comprising a plurality of beams arranged transversely of the body in spaced relation between the ends thereof; a plurality of ribs having legs secured to the beams, upstanding from the bed and having connecting portions across the top of the body, the ribs being outside the inner shell and constituting support means for the shell, and the plastic insulating material being bonded to the ribs as well as the other components aforesaid, the beams including pairs of channels disposed back-to-back, and the ribs having their ends between and supported against the backs of the channels.

4. In a method of making a truck body, the steps of: making a bed for the body; setting up a plurality of spaced ribs and supporting them in vertical position on the bed at their bases; mounting evaporator tubing in horizontal position on the ribs recessed into the inner edges thereof and thereby supporting the tubing on the ribs and forming a self-supporting subassembly of the bed, the ribs and the tubing applying sheet type inner walls onto the inner edges of the ribs and securing the tubing thereto in heat-conducting relationship; filling the space between the ribs by flowing thereinto a foam plastic and uniting the plastic, the ribs, the tubing and the inner wall into a continuous single structural unit, and forming an outside wall surface.

5. In the method of claim 4, the steps of setting up a plurality of cross beams and securing the bases of the ribs to them as a support; and laying a floor over the cross beams by applying plastic slabs over the beams, and metal plates over the slabs.

6. In the method of claim 4, the steps of uniting the evaporator coils to the inner wall by a heat-conducting flexible mastic.

7. In the method of claim 4, the steps of applying another plastic material in fluent condition to the outside of the integral wall to form the outside wall surface.

8. A refrigerated truck body, including: a bed, the bed comprising a plurality of spaced beams transverse to the body, polyurethane slab means disposed over the beams and aluminum slab means over the polyurethane slab means to form a bottom wall for the bed; a plurality of rib means secured to the beams at the sides of the body, the rib means extending upwardly and over the top of the body; the ribs having notches along their inner edges, the notches opening inward toward the interior of the body; evaporator coil means supported upon the ribs in the notches with their innermost portions held flush with the inner sides of the ribs; the bed, the rib means, and the coil means comprising a self-supporting subassembly; metal panels secured to the inner sides of the ribs adjacent the coil means and closing the open ends of the notches; plastic heat-conducting adhesive means connecting the evaporator coil means to the metal panels; polyurethane filling means between and bonded to the ribs, the panels and the evaporator means; the filling means being of the foam type that can be flowed into place; and an outside surface of glass fiber polyester of the type that can be applied in fluent state, covering the outside of the polyurethane filling means.

9. In the body of claim 8, metal angles in the corners of the wall and floor to join and seal them.

References Cited by the Examiner

UNITED STATES PATENTS

| | | | |
|---|---|---|---|
| 2,021,909 | 11/35 | Brigham | 105—409 |
| 2,228,509 | 1/41 | Dean | 105—419 |
| 2,486,822 | 11/49 | Cameron | 165—180 |
| 2,657,088 | 10/53 | Clement. | |
| 2,882,701 | 4/59 | Nelson et al. | 62—239 |
| 2,896,271 | 7/59 | Kloote et al. | 296—31 |
| 2,958,210 | 11/60 | Rill. | |
| 2,962,323 | 11/60 | McBride | 105—423 |
| 3,003,810 | 10/61 | Kloote et al. | 296—31 |

FOREIGN PATENTS

| | | |
|---|---|---|
| 154,590 | 7/51 | Australia. |
| 632,462 | 12/61 | Canada. |
| 835,409 | 5/60 | Great Britain. |

ROBERT A. O'LEARY, *Primary Examiner.*